(12) United States Patent
Parker

(10) Patent No.: US 6,429,892 B1
(45) Date of Patent: Aug. 6, 2002

(54) AUTOMATED SELF-PORTRAIT VENDING SYSTEM

(76) Inventor: James T. Parker, 102 Livius Ct., Goldsboro, NC (US) 27534

( * ) Notice: Subject to any disclaimer, the term of this patent is extended or adjusted under 35 U.S.C. 154(b) by 0 days.

(21) Appl. No.: 09/245,576

(22) Filed: Feb. 5, 1999

(51) Int. Cl.[7] .................................................. H04N 7/18
(52) U.S. Cl. ........................................ 348/77; 348/150
(58) Field of Search ................................ 348/373, 150, 348/77

(56) References Cited

U.S. PATENT DOCUMENTS 5,587,740 A * 12/1996 Brennan ..................... 348/373
5,897,220 A * 4/1999 Huang et al. ................... 396/2
6,141,482 A * 10/2000 Massarksy .................... 386/46

* cited by examiner

Primary Examiner—Andy Rao
(74) Attorney, Agent, or Firm—Mills Law Firm PLLC

(57) ABSTRACT

An automated self-portrait vending system includes a free standing booth having a video camera positioned to continuously view and display on a monitor a memorable landmark of a picturesque tourist setting that may be user operated to capture a plurality of frozen video images of the setting and user posed therewithin for user selection and combination with souvenir overlays to provide an instant photographic memento of the setting.

18 Claims, 3 Drawing Sheets

AUTOMATED SELF-PORTRAIT VENDING SYSTEM

FIELD OF THE INVENTION

The present invention relates to photographic self-portrait installations, and in particular, to an automated video photographic vending system for producing a consumer-selected, instant photograph of the vendor and/or colleagues posed against a scenic topical landmark and personalized from a palette of computer generated foreground and background images.

BACKGROUND OF THE INVENTION

Coin operated self-portrait booths have been used for many years to produce strips of wallet sized photographs using conventional cameras and wet-film techniques. While enabling the user to capture on film a variety of poses, the remainder of the photographs is limited a standard backdrop scene. Other self-portrait systems have proposed using video cameras for previewing poses prior to the camera taking the photographs. Such booths are generally located in shopping malls or other high traffic areas, relying upon the occasional shopper as a customer. Little promotion is undertaken to boost revenues and impulse-buying motivates the buyer to purchase such photographs taken against stark backgrounds.

To partially overcome such limitations, it has been proposed to provide a photo installation using a video camera to generate composite photographs that combine a foreground selected from a memory bank with the user's posed image. Therein the user selects a foreground image from a plurality of choices. The user then assumes a set pose whereat a video camera freezes the image for superimposition on the selected background. Such a system provides for limited interaction between the posed images and the generated images in achieving the final photographic reproduction. Moreover, such installations remain inconspicuously located and provide mere backdrop facades for the user.

Further variations of self-portrait installations, as disclosed in David et. al., U.S. Pat. No. 5,539,453, have proposed using a video camera to provide a real time image of the user. The video camera is coupled with a computer for, first, sequentially capturing a consumer-actuated image of the user and, second, generating a computer-digitized image background, and third, combining such images to provide potential composite photographs, one of which is consumer selected and the final product vended to the user. Such installations are somewhat limited in consumer choice of the final photograph inasmuch as user pose must be selected prior to presenting the background variations. Emphasis is on the user to the exclusion of any background scenery significance. The system is also user paced such that an indecisive consumer can occupy the installation for extended periods prior to making a final decision. Further, the user must physically actuate the system to capture a pose, limiting user positions and pose. Moreover, the user must select the computer image before proceeding to the final selection.

The foregoing having limited the revenues of self-operated systems to find increased user acceptance by only providing limited freedom posing against standard backgrounds in a manner that does not distinguish one installation from another.

BRIEF SUMMARY OF THE INVENTION

The present invention overcomes the above limitations by providing a computerized self-portrait vending unit that is adapted for location within a picturesque setting with high traffic volume frequented by consumers with readily available money for the purchase of items memorializing their visit, capturing against such settings selectable poses of the user, presenting a palette of images for combining with selected poses, and printing and vending to the user a composite picture recording their presence at the setting, all of which combine to produce an installation providing greater incentives for use and accompanying revenue.

To more fully achieve the revenue potential of such picturesque settings, the system, in the form of a free-standing kiosk or booth, is positioned to capture the user against memorable facade or landmark of the location, recognizable by others as symbolic thereof. Exemplary of such sights, without limitation, would be Cinderella's Castle at a Disney site, the Hollywood hill sign in Los Angeles, the Cape Hatteras lighthouse in North Carolina, or the Rock and Roll Museum in Cleveland, and other signature or hallmark structures or vistas that are synonymous with the venue. The unit can thus take advantage of the accompanying natural scenery as an instant souvenir and memento of their visit.

The system is enclosed in a weatherproof cabinet similar in size to existing arcade video game systems. The front of the unit is provided with a video camera located behind a transparent screen. The camera is self-focusing and directed to capture a memorable view of the location. A video monitor is provided adjacent to and below the camera to provide a viewing surface enabling the user to readily position themselves in desired poses and positions to be captured by the video camera. The camera and monitor operate continuously such that passers-by are attracted to the installation and can see trial, real-time views of themselves against the landmark prior to making a buying decision.

The video camera and the monitor are interfaced with a computer in the enclosure. Should a photograph be desired, the consumer actuates a button on the unit, which displays an instruction menu on the monitor and requests a form of payment, credit card or currency to begin the session. After receiving and verifying the payment transaction, the monitor again displays real time images of the user thereon. After a predetermined time, a sequence of frozen real-time images of the user against the scenic background are captured, without the need for user intervention, and digitized and stored in a memory bank. Preceding each capture, the user is provided with an audio or visual indication of time to capture so that they may assume a desired pose at any location within camera range. After a predetermined number of images are captured, the same are displayed in tiled format on the screen and the user selects a desired image. Thereafter, the desired image, in composite with a plurality of foreground graphics, are displayed in tiled format on the monitor. The user then selects the desired composite, which selection is outputted to a printer and a print of the composite photograph delivered through a vending slot to the user. Such photograph also includes a unique identifier permitting the user to subsequently order additional copies of the photos or variations thereof stored in computer memory. The installation also includes a telecommunication interface for providing the vendor with status information regarding usage and supplies. The interface may also be used to provide a video feed to a website associated with the landmark and setting.

Accordingly, it is an object of the present invention to provide a method for providing user selected photographic souvenirs of scenic vistas in a self-operated photographic installation.

A further object of the present inventions is to provide a free standing self-portrait installation in a picturesque setting which permits a user to freely assume a pose against a landmark of the setting which is imaged and combined with selected graphics to provide a photographic memento.

Yet another object of the present invention is to provide a self-portrait vending installation whereby a user can select an image from a plurality of self poses, combine the image with selected graphics and obtain a photographic reproduction of the selection.

A still further object of the present invention is to provide a computerized self-portrait installation located strategically in scenic venues for maximizing consumer use and revenues.

BRIEF DESCRIPTION OF THE DRAWINGS

The above and other objects, features and advantages of the present invention will become apparent upon reading the following detailed description of the preferred embodiments, taken in conjunction with the accompanying drawings in which.

DETAILED DESCRIPTION OF THE PREFERRED EMBODIMENTS

Mementos, souvenirs, picturesque postcards and photographs of notable vistas and venues are widely available at tourist attractions, regional and national, and memorialize visits to such locations. Such memorabilia typically exists in generic format doing little to personalize the visit. Personal cameras can provide a chronicle of the visit, but are limited to conventional format and, in general, are developed after the visit, notwithstanding the availability, but limited usage of instant cameras. Further, oftentimes the landmark vista for the photograph is not readily available and, unless a third party can be enlisted, all parties cannot be included therein.

Figure 1:
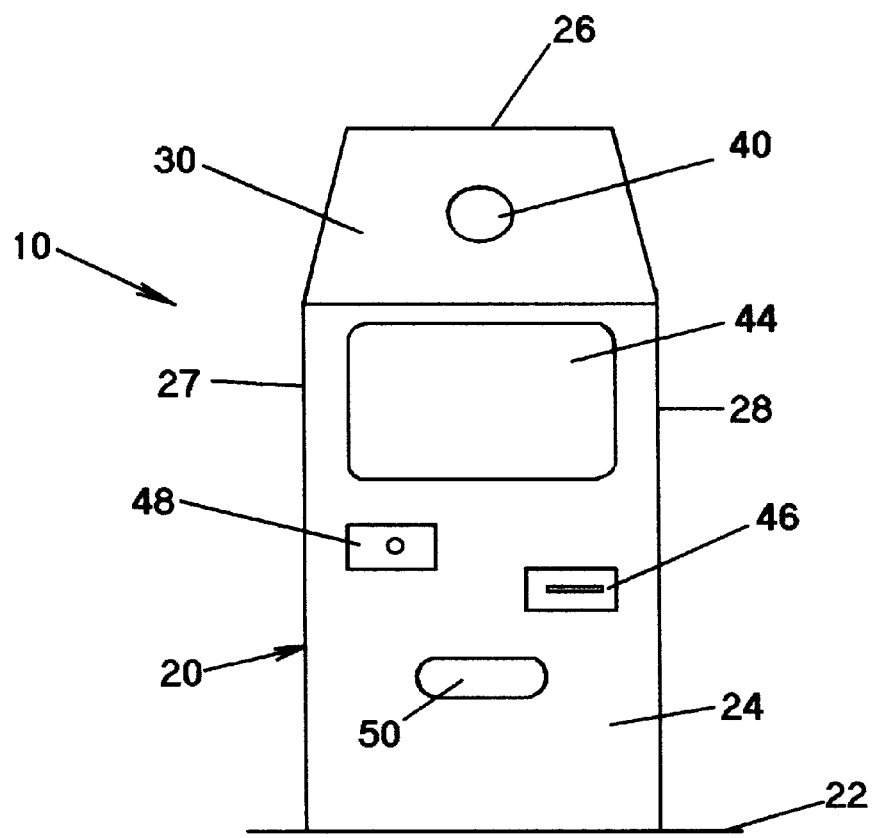
FIG. 1 is a front elevational view of a self-portrait installation in accordance with the invention.
Figure 2:
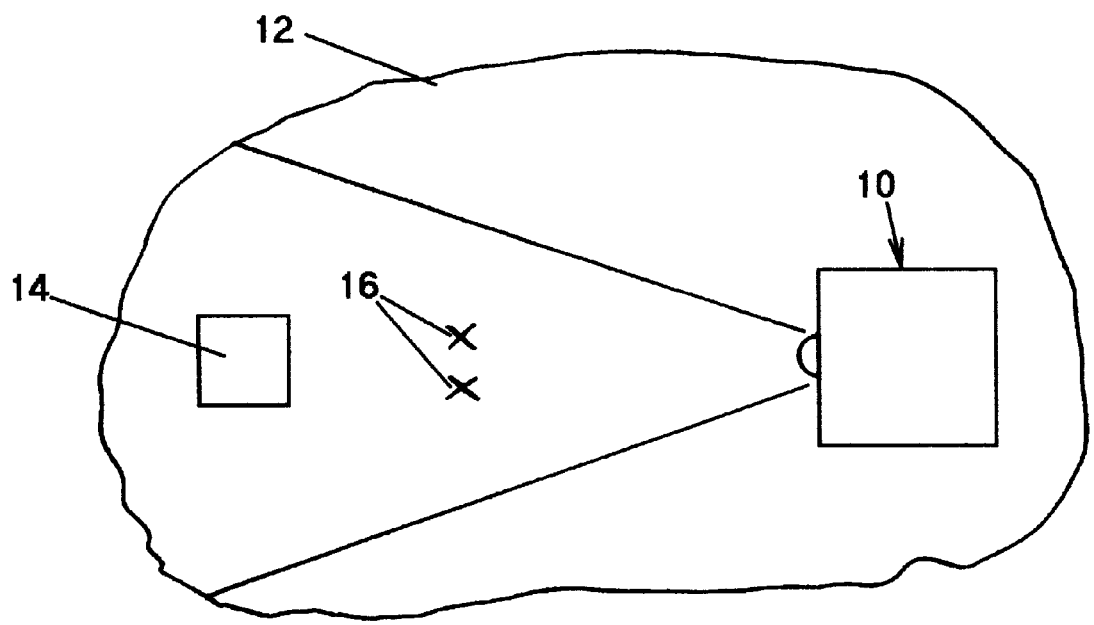
FIG. 2 is a schematic plan view of the self-portrait installation of FIG. 1 positioned in a surrounding including a focal landmark.

As shown in FIGS. 1 and 2, the present invention provides a free standing automated self-portrait vending system or installation 10 located within a picturesque setting or surrounding 12 and positioned to visually capture in retrievable form a graphic renditions of a landmark attraction 14 in the surrounding including individuals 16 interacting therewith having purchased services thereat. As described in greater detail below, both with respect to operation and service, the installation 10 allows the users to customize a photograph of themselves in the hallmark landscape with graphical interfaces generating a composite photographic product incorporating memento features commonly found with the aforementioned generic products.

More particularly, the vending system 10 includes a cabinet 20, generally rectangular in cross section, located in the surrounding on a fixed base or pad 22. The cabinet 20 is approximately the size of a conventional arcade video game. The cabinet 20 includes a front wall 24 providing access for service modules described below, a rear wall 26 including a service door, not shown, for accessing the interior, laterally spaced side walls 27 and 28, and a top wall 30. The cabinet 20 may be constructed of suitable tamper resistant materials for outdoor usage, preferably aluminum and steel panels joined to form a cubicle for the modules.

The front wall 24 of the cabinet 20 is suitably apertured to provide outward functional and outward visual access for the lens 40 of a self-focusing video camera 42, a video monitor 44, a currency acceptor 46, a control panel 48, and a product delivery chute 50.

Figure 3:
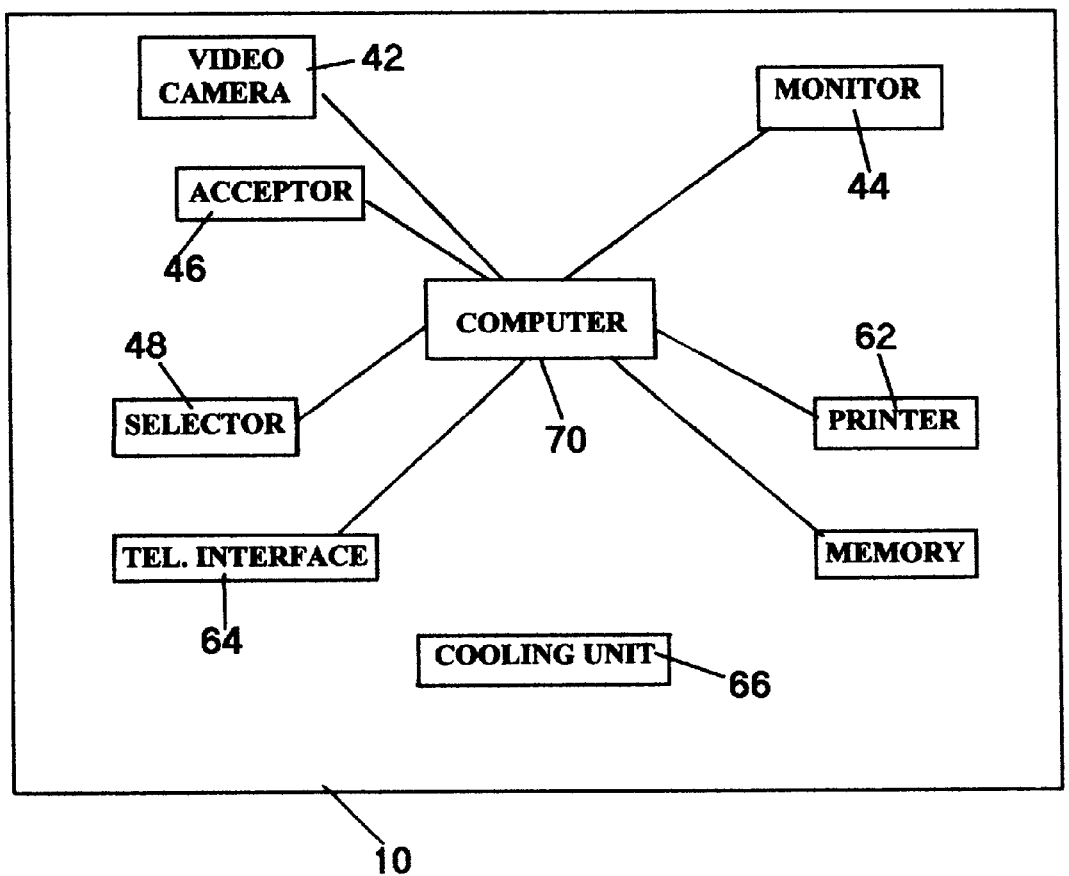
FIG. 3 is a schematic drawing of the hardware for the installation.

Referring to FIG. 3, the hardware system 60 for the installation 10 comprises the color video camera 42, the color monitor 44, a color printer 62, and the currency acceptor 46 operatively interfaced with a computer 70. Additionally operatively connected with the computer 70 is telecommunications interface 64 and control panel 48. The interface 64 provides information regarding status and operation of the installation. The interface 64 may also provide a video feed to a website for the facility, continuously or during non-photographic periods. A cooling system 66 is provided for maintaining the interior temperature of the cubicle within predetermined limits. The various components of the system are conventionally connected to suitable power supplies, not shown.

The video camera 42 may be selected from commercially available devices suitable for inputting image data to the computer 70, and interfacing with the computer software and printer 62. The camera 42 is also adapted to continuously display images, in real-time, on the monitor 44. A suitable video camera is the Sony TRS-63 home video camcorder. The camera also has suitable outputs for interfacing with the video capturing hardware and software. Preferably, the camera would incorporate features such as self focusing to permit free-roving positioning of the users within the captured view, and low light capability to allow use of the installation throughout the day and under varying climatic conditions.

The computer 70 may be selected from commercially available personal computers. The computer should have sufficient capacity to run quickly and efficiently the selected graphics software and provide capabilities for expansion. A Pentium based system is preferred. To reduce the heat load within the enclosure while providing the necessary ruggedness for the system, a laptop type system is preferred.

The monitor 44 is preferably a commercially available SVGA design. While the monitor size may vary in size, There should be sufficient viewing area to enable the user to visually appreciate the possibilities of varying poses within camera range and also provide a sufficiently large screen to attract the attention and interest of passersby. A 14 inch diagonal screen has been found satisfactory.

The printer 62 for such exterior application should be selected for reliability and quality in a free standing remote location. The printer may be selected from commercially available black and white or color models. Laser printers are preferred, although high resolution inkjet printers are acceptable. It is preferred that the printer have a printing capacity of at least one page per minute. The printer should also have sufficient paper capacity to operate at expected levels without resupply for extended periods of time.

The control panel should provide for durable, trouble free operation in the exterior environment and able to track on the monitor the various software generated options. In this connection, manually operable control buttons may interface with convention computer cursor wiring. Alternatively, touchscreen controls may be employed.

The currency acceptor 48 may be any conventional currency handling system employed in the vending machine art. Preferably, the acceptor will handle coin and paper currency. A suitable acceptor is available from VendTex.

Figure 4:
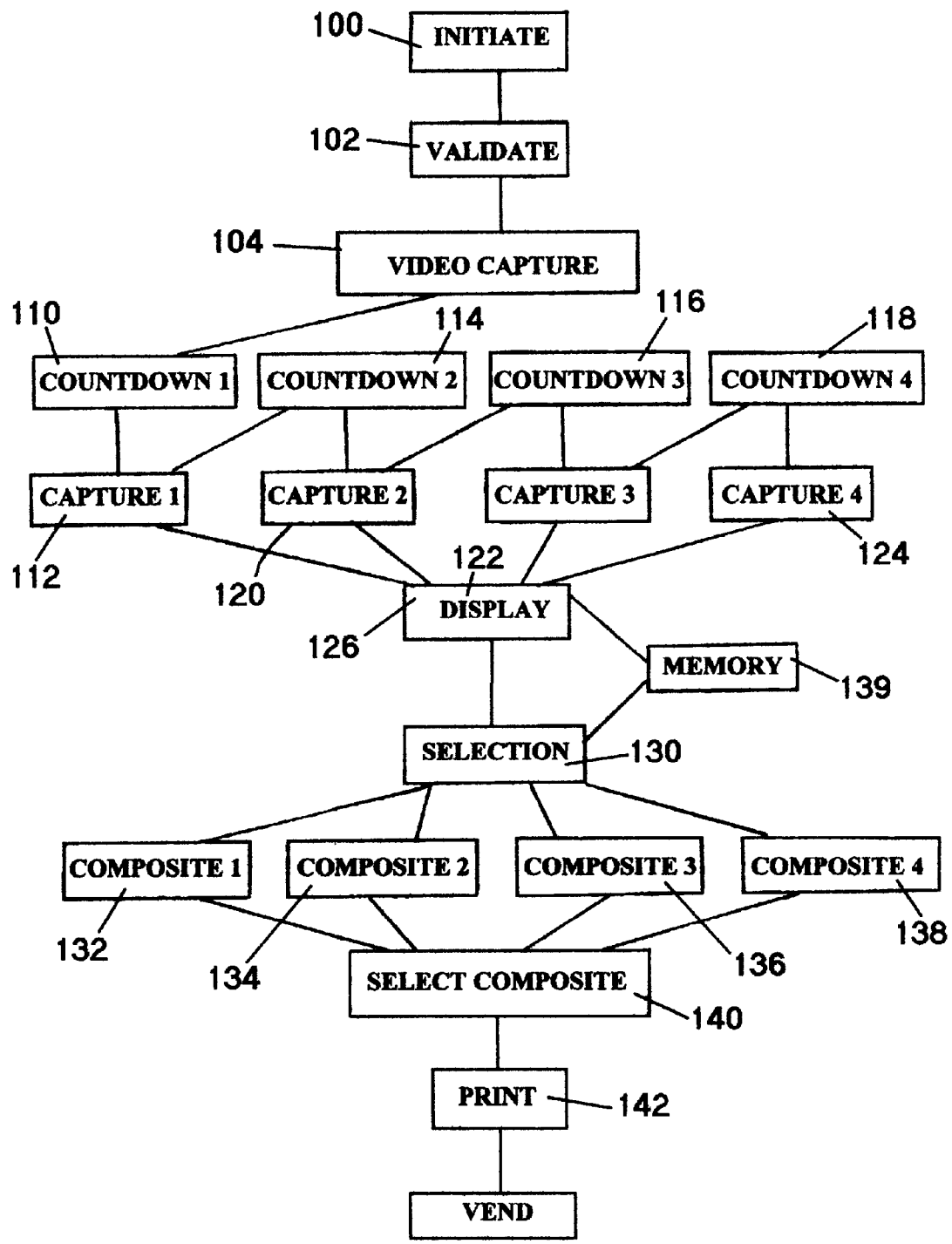
FIG. 4 is an operational flow chart for the installation.

Referring to FIG. 4, there is shown the software flow diagram incorporating the above components and providing video capture of the users within the scenic panorama. Generally, the software and the system provide for staged timed capture of a plurality of consumer poses against the background, presentation of the poses in simultaneous tiled format on the monitor, selection of a desired pose, presentation on the monitor screen, in simultaneous tiled format, the selected pose with a selection of souvenir graphical overlays, selection of a desired combination, and printing and delivery of the selected composite.

More specifically, in operation, a consumer initiates 100 the photographic session by depositing coinage or currency at the acceptor 46. After verification 102, a video capture sequence 104 is commenced with appropriate instructions for the consumers and associates to assume positions with respect to the landmark. Thereafter, a first countdown 110 begins during which the users assume location and pose within the camera range and at expiration thereof a first video capture 112 occurs. The aforementioned routine is repeated sequentially by countdowns 114, 116, 118 and respective video capture 120, 122, 124.

After the video capture sequence, the capture poses 112, 120, 122, 124 are presented as a display 126 on the monitor 44 in tiled format and the user is prompted to make a selection 130. Thereafter four selected poses are displayed as photographic composites 132, 134, 136, 138 in tiled format with four of the digitized stored images from memory 139. The user is then prompted to make a composite selection 140. The selection is inputted for printing 142 and thereafter a printed composite is vended 142 through the delivery slot.

Preferably, the vended photograph includes printed information on the reverse side thereof by which the user may reorder prints or order non-selected versions of the photographic session. In order to reference the photographic session to the stored images, the vended photograph on the front side bears a file number corresponding to the session and the stored images. Accordingly, the user at a later date and conveniently, may select additional poses and combinations, with or without the graphic foreground, thereby further increasing the revenue potential of the installation.

The telecommunication interface may be utilized for a variety of service and revenue functions. For instance, the vendor may address the computer to determine periodically the use and revenues of the installation, the status and supply of materials, and traffic and climatic conditions at the site. Moreover, the vendor may supply the facility with video feeds, continuously or during periods of non-use, for viewing at other locations therewithin or for use in connection with promotional activities such as websites, thereby further increasing the versatility and revenue potential of the installation.

While the present invention has been described in detail with reference to preferred embodiments thereof, other modifications and variations thereto will become apparent to those skilled in the art. Accordingly, the invention shall be interpreted and defined as set forth in the appended claims.

What is claimed:

1. A method for operating a self-portrait vending system, comprising the steps of:
   a. identifying a photographic site including a landmark readily identified with said site;
   b. positioning video recording means at said site and operable to capture continuous real time images of said landmark within a field of view;
   c. providing video display means operatively associated with said video recording means and operating said video recording means to provide continuous real time images at said video display means of said landmark and a subject passing between said video recording means and said landmark;
   d. providing at said video recording means selection means operable by said subject, said selection means upon operation by said subject prompting said subject to deposit payment into payment acceptor means and subsequent to said deposit instructing said subject to assume poses within said field of view;
   e. providing a subject recognizable indicia signaling to said subject that an image will be captured by said video means at the end of a predetermined period;
   f. visually capturing said image at said end of said predetermined period;
   g. sequentially repeating step e and step f to capture additional images;
   h. displaying on said video display means said image and said additional images;
   i. prompting said subject to select a session image from said image and said additional images displayed on the video display means;
   j. providing a plurality of digitized images at said video display means and in superimposition with said session image selected by said subject as a plurality of composite images viewable by said subject;
   k. prompting said subject to select one of said composite images;
   l. printing the composite image selected by said subject on a photographic media; and
   m. vending said photographic media including the printed composite image to said subject.

2. The method as recited in claim 1 including the step of continuously displaying said real time images of said landmark.

3. The method as recited in claim 1 including the step of providing a telecommunications interface and displaying said real time images at a remote location.

4. The method as recited in claim 3 including the step of providing a telecommunications interface for displaying said real time images at a website.

5. The method as recited in claim 1 including the step of storing said sessions image in storage means and assigning identifying means thereto.

6. The method as recited in claim 5 including the step of printing on said photographic media a replication of said identifying means.

7. The method as recited in claim 1 including the step of displaying said images in a tiled format.

8. The method as recited in claim 1 including the step of selecting said site based on the public recognition of the landmark.

9. The method as recited in claim 8 including selecting said site based on the tourism attraction thereof.

10. An automated self-potrait vending installation, comprising: booth means including a video camera for viewing a site outwardly thereof; a video monitor operatively coupled with said video camera for displaying continuous real time images of the site; computer means for controlling the operation of said video camera and said video monitor; memory means interfaced with said computer for storing images from said video camera and containing a plurality of digitized images; means for creating a frozen image from said real-time images; means for displaying a plurality of said frozen images on said video monitor; means responsive to user actuation for selecting one of said frozen images for display on said video monitor; first means operatively associated with said memory means and said video monitor for combining said one of said frozen images with digitized images and displaying on said video monitor a plurality of composite photographs; second means responsive to user actuation for selecting one of said composite photographs; printer means operatively connected with said second means for generating a printed copy of said composite photograph; and vending means for delivering printed copy exterior of said booth means.

11. The self-portrait video installation as recited in claim 10 wherein said site encompasses a publicly recognized landmark.

12. The self-portrait video installation as recited in claim 10 wherein said frozen images are displayed on said video monitor in a tiled format.

13. The self-portrait video installation as recited in claim 12 wherein said composite photographs are displayed in a tiled format.

14. The self-portrait video installation as recited in claim 11 wherein said video camera is self-focusing for capturing within said view the landmark and a subject positioned therebetween.

15. The self-portrait video installation as recited in claim 14 wherein said storage means includes a designation for said session and said printer means includes said designation on said vended composite photograph.

16. The self-portrait video installation as recited in claim 10 includes telecommunications interface means operatively connected with said booth means for connecting said video camera with a remote location.

17. The self-portrait video installation as recited in claim 16 wherein said remote location is a website.

18. The self-portrait video installation as recited in claim 10 wherein said capture means is activated in a predetermined time after prompting to said user.

* * * * *